US 8,947,574 B2

(12) United States Patent
Takano

(10) Patent No.: US 8,947,574 B2
(45) Date of Patent: Feb. 3, 2015

(54) IMAGING DEVICE AND IMAGING METHOD AND PROGRAM

(75) Inventor: Mayu Takano, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 329 days.

(21) Appl. No.: 13/353,794

(22) Filed: Jan. 19, 2012

(65) Prior Publication Data

US 2012/0194710 A1 Aug. 2, 2012

(30) Foreign Application Priority Data

Feb. 1, 2011 (JP) ................. 2011-020024

(51) Int. Cl.
*H04N 5/222* (2006.01)
*H04N 1/60* (2006.01)
*H04N 5/232* (2006.01)
*H04N 5/243* (2006.01)
*H04N 9/73* (2006.01)
*H04N 101/00* (2006.01)

(52) U.S. Cl.
CPC ......... *H04N 1/6027* (2013.01); *H04N 5/23216* (2013.01); *H04N 5/23293* (2013.01); *H04N 5/243* (2013.01); *H04N 9/735* (2013.01); *H04N 1/6008* (2013.01); *H04N 2101/00* (2013.01)
USPC ................. 348/333.01; 348/333.12

(58) Field of Classification Search
CPC .......... H04N 5/23216; H04N 5/23293; H04N 5/243; H04N 1/6027; H04N 1/6008; H04N 9/735
See application file for complete search history.

(56) References Cited

U.S. PATENT DOCUMENTS

| | | | |
|---|---|---|---|
| 5,602,412 A | 2/1997 | Suzuki et al. | |
| 6,262,817 B1* | 7/2001 | Sato et al. | 358/518 |
| 6,313,875 B1 | 11/2001 | Suga et al. | |
| 6,380,972 B1 | 4/2002 | Suga et al. | |
| 7,646,414 B2* | 1/2010 | Koseki et al. | 348/333.01 |
| 7,649,564 B2* | 1/2010 | Suekane et al. | 348/333.02 |
| 7,907,836 B2 | 3/2011 | Shinohara et al. | |
| 7,920,203 B2* | 4/2011 | Kawamura | 348/362 |
| 8,417,110 B2* | 4/2013 | Tohyama | 348/333.02 |
| 2005/0062875 A1 | 3/2005 | Ojima | |

(Continued)

FOREIGN PATENT DOCUMENTS

| | | |
|---|---|---|
| EP | 1 786 215 A2 | 5/2007 |
| JP | 7-23287 | 1/1995 |

(Continued)

OTHER PUBLICATIONS

Extended European Search Report Issued Apr. 24, 2012 in Patent Application No. 12151808.8.

(Continued)

*Primary Examiner* — Luong T Nguyen
(74) *Attorney, Agent, or Firm* — Oblon, Spivak, McClelland, Maier & Neustadt, L.L.P.

(57) ABSTRACT

An imaging device includes a display on which a captured image of a subject is displayed, a first corrector to correct a first parameter related to shooting of the subject, a second corrector to correct a second parameter related to image processing to the captured image, and an automatic correction controller to determine a correction amount for the second parameter on the basis of a correction amount for the first parameter corrected by the first corrector, and control the second corrector to correct the second parameter by the determined correction amount.

15 Claims, 6 Drawing Sheets

(56) References Cited

U.S. PATENT DOCUMENTS

| | | |
|---|---|---|
| 2005/0270397 A1* | 12/2005 | Battles .................... 348/333.01 |
| 2007/0120987 A1 | 5/2007 | Kobayashi |
| 2009/0237548 A1 | 9/2009 | Watanabe et al. |
| 2010/0296806 A1 | 11/2010 | Seo et al. |
| 2011/0200311 A1 | 8/2011 | Shinohara et al. |

FOREIGN PATENT DOCUMENTS

| | | |
|---|---|---|
| JP | 8-65699 | 3/1996 |
| JP | 2002-271654 | 9/2002 |
| JP | 2002-290780 | 10/2002 |
| JP | 2004-343476 | 12/2004 |
| JP | 2005-62370 | 3/2005 |
| JP | 2006-165941 | 6/2006 |
| JP | 2007-027984 | 2/2007 |
| JP | 2009-111532 | 5/2009 |
| JP | 2009-225237 | 10/2009 |
| JP | 2009-261030 | 11/2009 |
| JP | 2010-114941 | 5/2010 |

OTHER PUBLICATIONS

Office Action issued Oct. 7, 2014 in Japanese Patent Application No. 2011-020024.

* cited by examiner

FIG. 6

| EXPOSURE CORRECTION AMOUNT [EV] | COLOR GAIN | |
| --- | --- | --- |
| | R | B |
| +3.0 | ×1.0 | ×1.2 |
| +2.5 | ×1.0 | ×1.2 |
| +2.0 | ×1.0 | ×1.2 |
| +1.5 | ×1.0 | ×1.2 |
| +1.0 | ×1.0 | ×1.2 |
| +0.5 | ×1.0 | ×1.2 |
| ±0 | ×1.0 | ×1.0 |
| −0.5 | ×1.2 | ×1.0 |
| −1.0 | ×1.4 | ×1.0 |
| −1.5 | ×1.6 | ×1.0 |
| −2.0 | ×1.6 | ×1.0 |
| −2.5 | ×1.6 | ×1.0 |
| −3.0 | ×1.6 | ×1.0 |

IMAGING DEVICE AND IMAGING METHOD AND PROGRAM

CROSS REFERENCE TO RELATED APPLICATION

The present application is based on and claims priority from Japanese Patent Application No. 2011-20024, filed on Feb. 1, 2011, the disclosure of which is hereby incorporated by reference in its entirety.

BACKGROUND OF THE INVENTION

1. Field of the Invention

The present invention relates to an imaging device, an imaging method and an imaging program which can set exposure while a captured image is displayed on a display, and automatically correct a variation in the color of a captured image occurring from exposure correction, and correct the exposure and color of the image on the same display screen in accordance with a user's operation.

2. Description of the Prior Art

A known imaging device such as a digital camera can selectively set a photographic scene in order to easily set optimal photographic conditions in accordance with a subject. Another known imaging device can change exposure and white balance according to photographic situation or users' tastes. In these imaging devices the correctable exposure range and unit of setting are uniformly determined so that exposure correction cannot be performed in an optimal range or unit set depending on a photographic scene. In view of the problem, Japanese Patent Application Publication No. 2005-62370 discloses an imaging device which can change the range and unit of correction amount used in setting exposure in accordance with a photographic scene.

With an imaging device having a display, a user can shoot a subject or correct exposure while checking the image of the subject on the display.

In general, it is known that in correcting exposure to darken an image, the image on the display is changed to appear more bluish. Therefore, it may be necessary to correct the color of the image when brightness of the image is changed by exposure correction. This makes a user's operation complicated. That is, the user can correct the exposure of a captured image while viewing it on the display but needs to switch a setting screen to adjust the color of the image which varied due to the exposure correction. Furthermore, the user may need to re-adjust the exposure changed by the color adjustment and switch the setting screen again, which is complicated and troublesome.

SUMMARY OF THE INVENTION

An object of the present invention is to provide an imaging device, an imaging method, and an imaging program which can automatically correct a variation in the color of a captured image occurring from exposure correction, and correct the exposure and color of an image on the same screen in accordance with a user's manipulation.

According to one aspect of the present invention, an imaging device includes a display on which a captured image of a subject is displayed, a first corrector to correct a first parameter related to shooting of the subject, a second corrector to correct a second parameter related to image processing to the captured image, and an automatic correction controller to determine a correction amount for the second parameter on the basis of a correction amount for the first parameter corrected by the first corrector, and control the second corrector to correct the second parameter by the determined correction amount.

BRIEF DESCRIPTION OF THE DRAWINGS

Features, embodiments, and advantages of the present invention will become apparent from the following detailed description with reference to the accompanying drawings:

FIG. 6 is a table containing data used for setting exposure amount and color amount by way of example;

DETAILED DESCRIPTION OF THE PREFERRED EMBODIMENT

Hereinafter, one embodiment of the present invention will be described in detail with reference to the accompanying drawings. Wherever possible, the same reference numbers will be used throughout the drawings to refer to the same or like parts.

Figure 1:
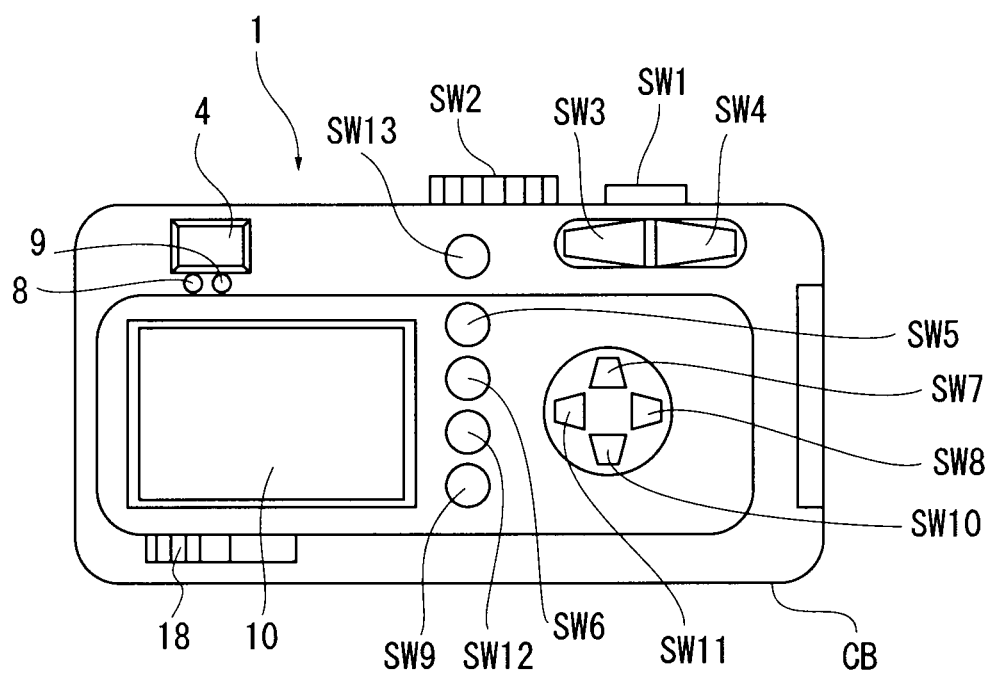
FIG. 1 is a back view of a digital camera as an example of an imaging device according to one embodiment of the present invention.

FIG. 1 is a back view of a digital camera as an example of an imaging device according to one embodiment of the present invention. An imaging device 1 includes a camera body CB having, on the back face, an optical viewfinder 4, an autofocus light emitting diode (LED) 8, a stroboscopic LED 9, a LCD 10, a power switch SW13, a wide-angle zoom switch SW3, a telescopic zoom switch SW4, a self-timer set/reset switch SW5, a menu switch SW6, an upward/strobe switch SW7, a rightward switch SW8, a display switch SW9, a downward/macro switch SW10, a leftward/image check switch SW11, and an OK switch SW12. Further, the camera body CB includes a shutter button SW1 and a mode dial SW2 for setting a shooting mode on the top face.

Figure 2:
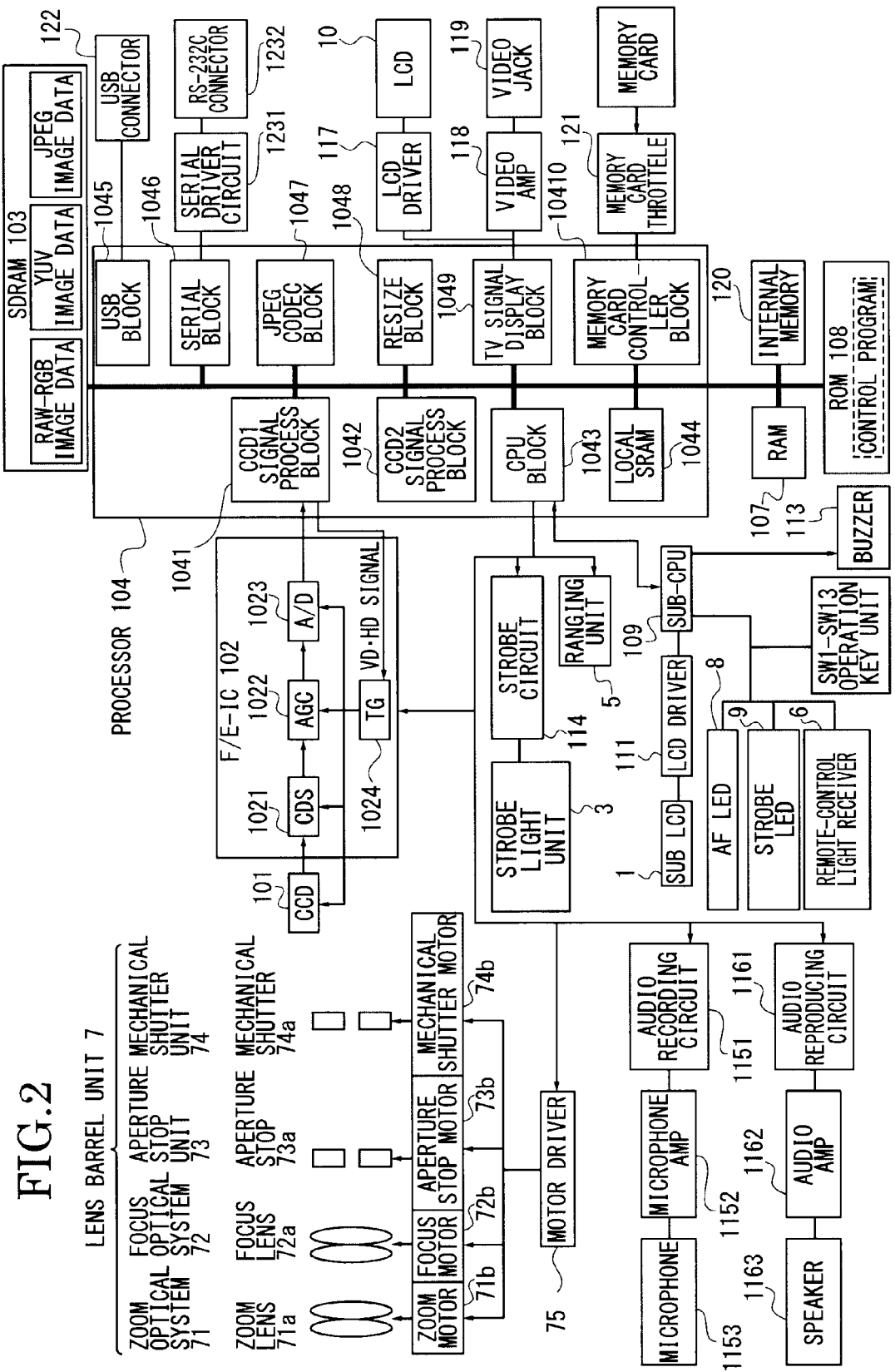
FIG. 2 is a function block view of an example of an electric control system of the imaging device in FIG. 1.

Next, the function blocks of the imaging device 1 are described with reference to FIG. 2. The operations or processing of the imaging device 1 are controlled by an imaging program according to one embodiment of the present invention executed by a processor 104 as a digital signal processing integrated circuit (IC). The processor 104 includes a first charge coupled device (CCD1) signal processing block 1041, a second CCD (CCD2) signal processing block 1042, a CPU block 1043, a local SRAM (static random access memory) 1044, a USB (universal serial bus) block 1045, a serial block 1046, a JPEG CODEC block 1047, a resize block 1048, a TV signal display block 1049 and a memory card controller block 10410. These blocks are connected with each other by bus lines.

Outside of the processor 104 an SDRAM 103 (synchronous random access memory), a RAM 107, an internal memory 120, a ROM 108 which stores a control program are provided and connected to the processor 104 via a bus line.

The SDRAM 103 stores RAW-RGB image data, YUV image data and JPEG image data of a captured subject image.

A lens barrel unit 7 includes a zoom optical system 71 having a zoom lens 71a, a focus optical system 72 having a focus lens 72a, an aperture stop unit 73 having an aperture stop 73a and a mechanical shutter unit 74 having a mechanical shutter 74a. The optical zoom system 71, optical focus system 72, aperture stop unit 73 and mechanical shutter unit 74 are driven by a zoom motor 71b, a focus motor 72b, an aperture stop motor 73b and a mechanical shutter motor 74b, respectively. These motors are driven by a motor driver 75 which is controlled by the CPU block 1043 of the processor 104.

The zoom lens 71a and the focus lens 72a constitute the imaging lens which focuses a subject image on the imaging plane of the CCD 101. The CCD 101 is an image sensor to convert the subject image into an electric image signal and output the image signal to an F/E (front end)-IC 102.

The F/E-IC 102 includes a correlated double sampling (CDS) 1021, an automatic gain controller (AGC) 1022 and an analog-digital (A/D) converter 1023 to perform predetermined processings to the image signal and convert it to digital image data, respectively. The image data are input to the CCD1 signal processing block 1041 of the processor 104. The signal processing is controlled by a vertical drive (VD) signal and a horizontal drive (HD) signal from the CCD1 signal processing block 1041 via a timing generator (TG) 1024. The F/F-IC 102 processes image signals in synchronization with the VD/HD signals via the TG 1024. The CCD1 signal processing block 1041 performs signal processing such as white balance adjustment, γ adjustment to the digital image data and outputs the VD/HD signals.

The CPU block 1043 of the processor 104 is configured to control an audio recording of an audio recording circuit 1151. Audio is converted into an audio recording signal by a microphone 1153, amplified by a microphone amplifier 1152 and recorded on the internal memory 120.

The CPU block 1043 also controls the operation of an audio reproducing circuit 1161. The audio reproducing circuit 1161 is configured to read audio data from the internal memory 120 and amplifies it with an audio amplifier 1162 for outputs from a speaker 1163. The CPU block 1043 also controls a stroboscopic circuit 114 to emit light from a strobe light unit 3, and controls a ranging unit 5.

The CPU block 1043 is connected to a sub-CPU 109 disposed outside the processor 104 and the sub CPU 109 controls display on a sub LCD 1 via an LCD driver 111. The sub CPU 109 is connected with an autofocus LED 8, a strobe LED 9, a remote-control light receiver 6, an operation key unit having the switches SW1 to SW13, and a buzzer 113.

The USB block 1045 is connected to a USB connector 122, and the serial block 1046 is connected to a RS-232C connector 1232 through a serial driver circuit 1231. The TV signal display block 1049 is connected to the LCD 10 via an LCD driver 117 and to a video jack 119 via a video amplifier 118. The memory card controller block 10410 is connected to a contact point between a memory card throttle 121 and a memory card to electrically connect with the memory card when mounted in the throttle 121 and store image files on the memory card.

Figure 3:
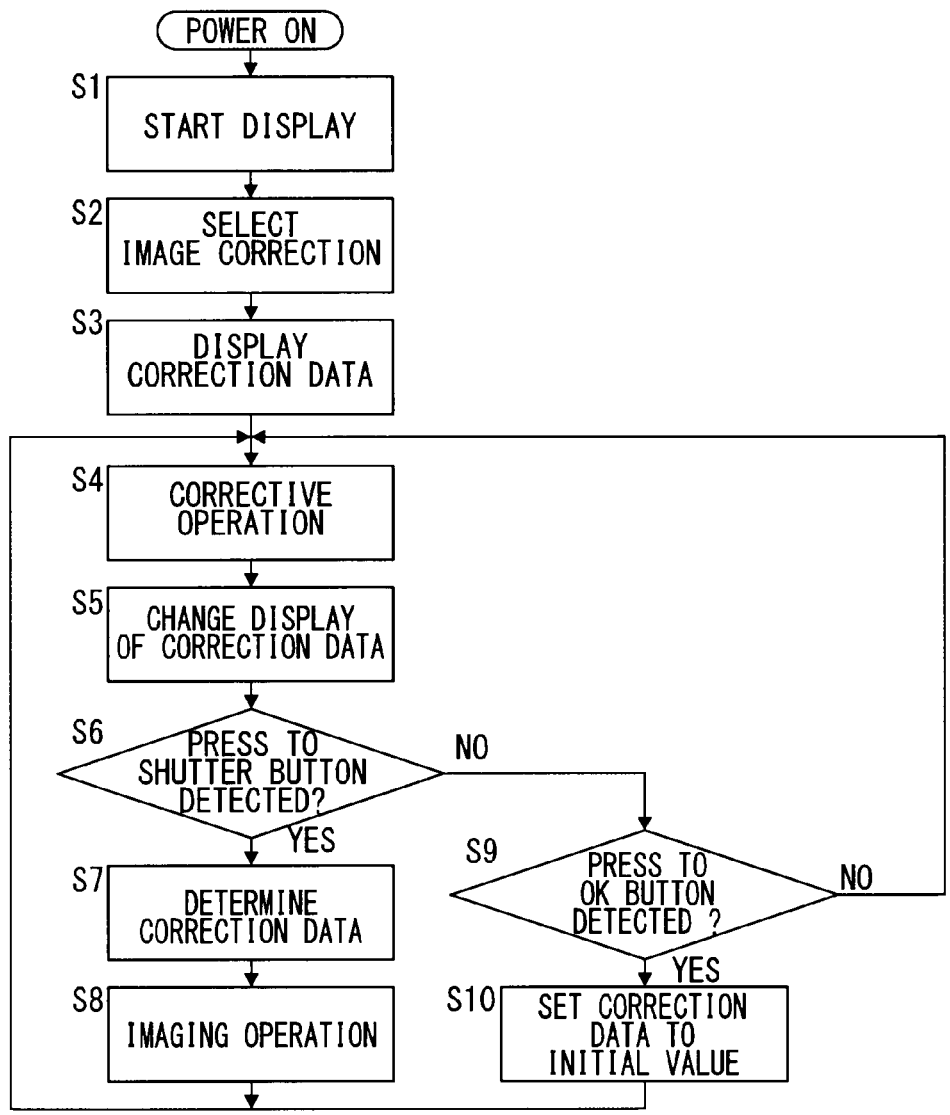
FIG. 3 is a flowchart for the operation of the imaging device by way of example.
Figure 4:
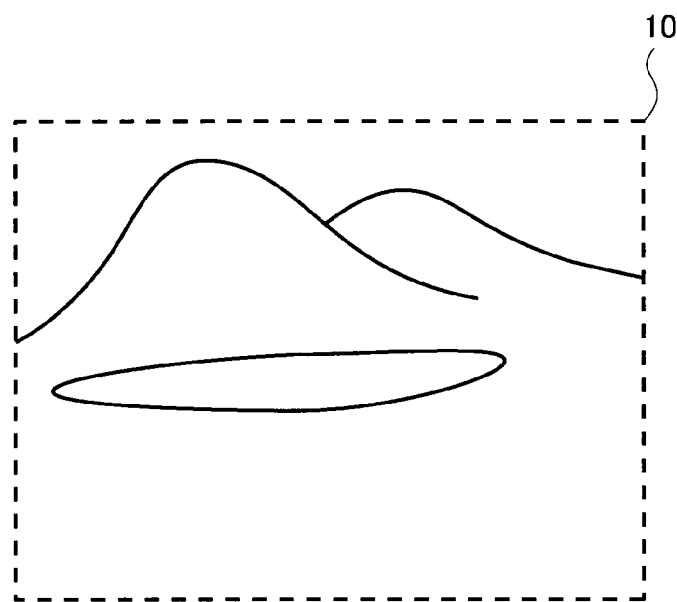
FIG. 4 shows an example of a captured image on a display of the imaging device.

Now, the operation of the imaging device is described with reference to FIG. 3 by way of example. First, upon power-on of the imaging device 1 with the power switch 13, the image of a subject captured via the optical system is converted into an image signal by the CCD 101, and the image signal is subjected to a predetermined image processing and displayed on the LCD 10 for preview in step S1. FIG. 4 shows an image display on the LCD 10 after starting the preview display. During the preview display, a user presses down the menu switch SW6 to display a not-shown operation menu on the LCD 10, for example. Then, the user manipulates the switches SW7, SW8, SW10, SW11 to select a desired operation and manipulates the OK switch SW12 to store the settings of the selected operation. In the following, an image correction menu of the imaging device 1 to correct the color and exposure of an image displayed on the LCD 10 is described.

Figure 5:
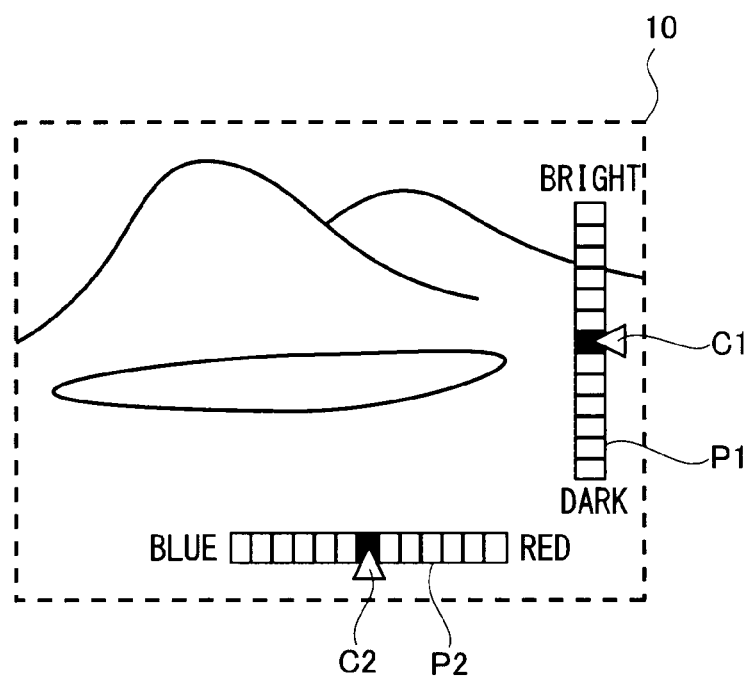
FIG. 5 shows an example of a setting screen for image correction on the display.

In step S2 the image correction menu is selected and in step S3 correction data is displayed on the LCD 10. FIG. 5 shows an example of a display of image correction data. The LCD 10 displays an indicator P1 to indicate exposure correction amount as a first parameter at the right end and an indicator P2 to indicate color correction amount as a second parameter at the bottom end. In FIG. 5 the indicator P1 is configured to change the exposure correction amount in 13 levels. A cursor C1 of the indicator P1 points at a current exposure amount. The exposure correction amount is ±0 [EV] when the cursor C1 is at the center of the indicator P1, and the upper half of the indicator P1 is for increasing the exposure and the lower half is for decreasing the exposure. For example, in a case where the exposure amount can be varied in unit of 0.5 [EV], the exposure amount when the cursor C1 is at the topmost position of the indicator P1 is +3.0V while that when the cursor C1 is at the bottom position is −3.0 [EV]. Thus, while the cursor C1 is above the center of the indicator P1, the image is brightened on the display and while it is below the center, the image is darkened.

Further, the indicator P2 is configured to change the color correction amount in 13 levels. A cursor C2 of the indicator P2 points at a current color amount. The color correction amount is 1.0 when the cursor C2 is at the center of the indicator P2, and the right half of the indicator P2 is for correcting red color and the left half is for correcting blue color. For example, when the unit of color change is 0.2, the red color can be corrected by 1.0 to 2.2 and the blue color can be corrected by 1.0 to −2.2. Thus, while the cursor C2 is on the right side of the indicator P2, the image on the display is changed to be more reddish and while it is on the left side, the image is changed to be more bluish.

Returning to FIG. 3, by operating the switches SW7, SW10 to correct exposure while the indicators P1, P2 as correction data are displayed, the cursor C1 is moved on the indicator P1 and an exposure amount corresponding to the position of the cursor 1 is selected in step S4. The brightness of the image on the LCD 10 is changed in line with the selected exposure amount and the color and brightness thereof are changed by a color amount (gain coefficient) corresponding to the selected exposure amount.

A table containing the exposure correction amount and the color amount in FIG. 6 is stored in the ROM 108, for example. In the table the gain coefficients of red (R) component and blue (B) component are defined in association with the values of exposure correction amount [EV]. At the exposure correction amount being 0 EV, the gain coefficients of the R and B components are both ×1.0. Thus, with no exposure correction, no color change occurs. At the exposure correction amount being −0.5 EV, the displayed image is darkened and becomes bluish as a whole. In order to correct this, only the gain coefficient of R component is increased to, for example, 1.2 and that of B component remains 1.0. The smaller the exposure correction amount, the larger the gain coefficient of R component.

At the exposure correction amount being +0.5 EV, the displayed image becomes slightly reddish. To correct this, the gain coefficient of B component is set to 1.2 and that of R component remains 1.0. The color change in an image can be thus adjusted in accordance with the exposure correction amount using the gain coefficients separately defined for R and B components. In line with the exposure correction amount set in step S4, the color gain coefficient is selected to automatically change the color of the image on the LCD 10.

Figure 7:
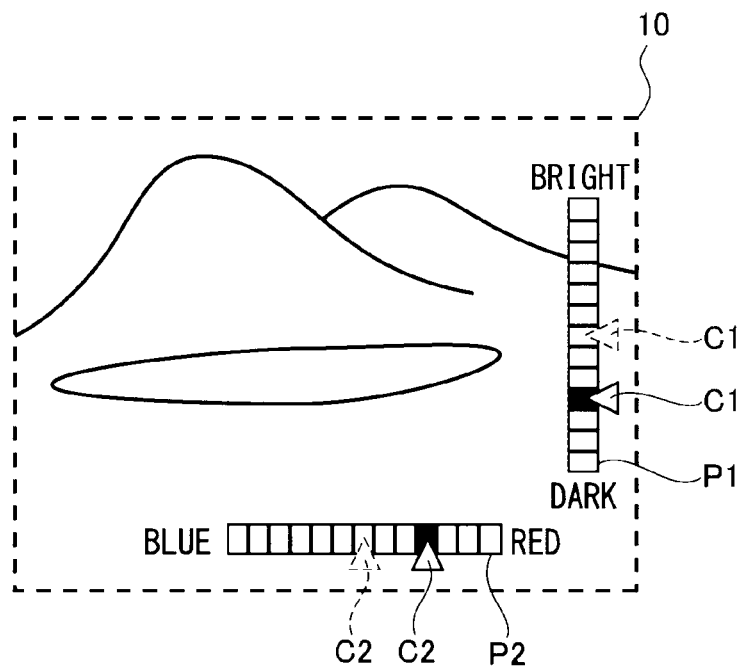
FIG. 7 shows another example of the setting screen for image correction on the display.

In step S5 the display of the indicators P1, P2 is automatically changed for the exposure and color correction of the displayed image. FIG. 7 shows cursors C11, C21 of the indicators P1, P2 pointing at the levels before the correction operation in step S4. When the user manipulates the switch SW10 to correct exposure and move the cursor to C1 pointing at the exposure correction amount at −1.5 EV. As shown in FIG. 6, at the exposure correction amount being −1.5 EV, the gain coefficient of R component is 1.6. Then, the cursor of the indicator P2 is shifted from the position C21 to C2 by 3 levels (corresponding to the gain coefficient of 1.6) rightward. Thus, the user can know that the color of the image has been automatically corrected. Note that FIG. 7 shows both the cursors C11, C21 for the sake of convenience, however, the imaging device 1 according to the present embodiment is not configured to display the cursors C1 and C11 and C2 and C21 concurrently.

Figure 8:
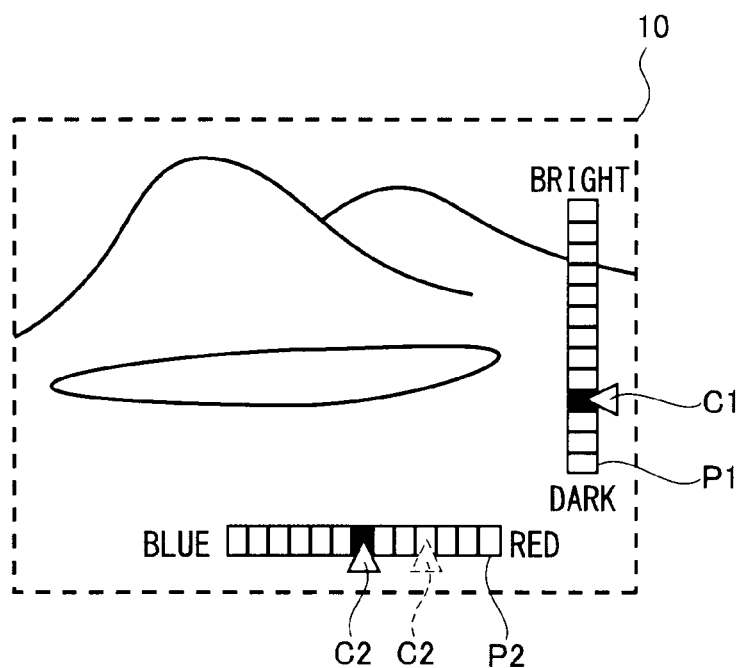
FIG. 8 shows still another example of the setting screen for image correction on the display.

Upon press to the shutter button SW1 (Yes in step S6), the exposure amount and gain coefficient currently selected are set in step S7 and the image is processed using the set exposure amount and color amount in step S8. Upon press to the OK switch SW12 in FIG. 1 instead of the shutter button SW1 (No in step S6), the exposure amount and gain coefficient currently selected are set as initial values for the next image correction. Moreover, the user can manipulate the switches SW8 and SW11 instead of the OK switch SW12 to manually change the automatically set color amount (No in step S9 and S4). For example, at the exposure correction amount being −1.5 EV, the image can be changed to be slightly bluish by moving the cursor C2 leftward as shown in FIG. 8. Alternatively, with the color amount corrected, the image exposure can be automatically corrected referring to the table in FIG. 6.

Thus, the imaging device according to the present embodiment can automatically correct the color of an image simultaneously with the exposure correction. Further, it is made possible for the user to manually change the automatically set color amount without switching the screen display by manipulating the color amount indicator displayed together with the exposure amount indicator.

Further, the imaging device according to the present embodiment can automatically correct a change in the color of a captured image resulting from the exposure correction while allowing the user to visually check the corrected image on the display. Moreover, the user can manually change the automatically set color amount on the same screen without switching the exposure setting screen and easily and optimally set the parameters as the exposure amount related to shooting condition and the color amount related to image processing. In addition, the LCD 10 can be a touch panel so that the user can operate the indicators P1, P2 with his/her finger.

The imaging device and imaging method according to the present embodiment are applicable to a camera function of a mobile phone and various cameras with a viewfinder function, in addition to a digital camera.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An imaging device comprising:
   a display on which a captured image of a subject is displayed;
   a first corrector to correct a first parameter related to shooting of the subject;
   a second corrector to correct a second parameter related to image processing to the captured image; and
   an automatic correction controller to determine a correction amount for the second parameter on the basis of a correction amount for the first parameter corrected by the first corrector, and control the second corrector to correct the second parameter by the determined correction amount,
   wherein the automatic correction controller comprises an adjust amount designator to display the corrected second parameter on the display and allow an operator to designate an adjust amount for the correction amount for the corrected second parameter, and
   an adjustment controller to adjust the corrected second parameter by the adjust amount designated by the adjust amount designator.

2. The imaging device according to claim 1, further comprising
   a memory unit in which basic information for calculating the correction amount for the second parameter from the correction amount for the first parameter is stored, wherein
   the automatic correction controller is configured to acquire the correction amount for the first parameter corrected by the first corrector, determine the correction amount for the second parameter on the basis of the acquired correction amount and the basic information stored in the memory unit, and control the second corrector to correct the second parameter by the determined correction amount.

3. The imaging device according to claim 1, wherein
   the automatic correction controller is configured to generate a new captured image in accordance with the corrected first and second parameters when the first corrector has corrected the first parameter and display the new captured image on the display.

4. The imaging device according to claim 1, wherein
   the display is in a rectangular form to display an indicator of the first parameter on one side and display an indicator of the second parameter on the other side orthogonal to the one side.

5. The imaging device according to claim 1, further comprising
   an operation element, wherein
   the adjust amount designator is configured to acquire the adjust amount for the second parameter in accordance with a manipulation of the operation element.

6. The imaging device according to claim 1, wherein:
   the display is a touch panel; and
   the adjust amount designator is configured to acquire the adjust amount for the second parameter in accordance with a touch position on the display.

7. The imaging device according to claim 1, wherein
   the adjust amount designator is configured to acquire the adjust amount for the second parameter in accordance with a touch position on an indicator.

8. The imaging device according to claim 6, further comprising
the correction amount designator to allow the operator to designate the correction amount for the first parameter, wherein:
an indicator is vertically displayed on either a right or left side of the display; and
the correction amount designator acquires the correction amount for the first parameter in accordance with a touch position on the indicator.

9. The imaging device according to claim 1, wherein:
the first parameter is an exposure amount;
the second parameter is a color amount; and
the automatic correction controller is configured to control the second corrector to correct the color amount to increase a red color when the first corrector decreases the exposure amount.

10. The imaging device according to claim 1, wherein:
the first parameter is an exposure amount;
the second parameter is a color amount; and
the automatic correction controller is configured to inhibit the second corrector from correcting the color amount when the first corrector increases the exposure amount beyond a predetermined value.

11. The imaging device according to claim 1, wherein
the automatic correction controller is configured to determine a correction amount for the first parameter on the basis of a correction amount for the second parameter corrected by the second corrector, and control the first corrector to correct the first parameter by the determined correction amount.

12. An imaging method comprising the steps of:
acquiring a correction amount for a first parameter related to shooting of the subject;
determining a correction amount for a second parameter related to image processing to the captured image on the basis of the acquired correction amount for the first parameter;
concurrently correcting the first and second parameters by the correction amounts, respectively;
displaying the correction amount for the second parameter on a display and allowing an operator to designate an adjust amount for the correction amount for the corrected second parameter; and
adjusting the corrected second parameter by the adjust amount.

13. The imaging method according to claim 12, further comprising the steps of:
acquiring a correction amount for the second parameter;
determining a correction amount for the first parameter on the basis of the acquired correction amount for the second parameter; and
concurrently correcting the first and second parameters by the correction amounts, respectively.

14. An imaging device comprising:
a display on which a captured image of a subject is displayed;
a first corrector to correct a first parameter related to shooting of the subject;
a second corrector to correct a second parameter related to image processing to the captured image; and
an automatic correction controller to determine a correction amount for the second parameter on the basis of a correction amount for the first parameter corrected by the first corrector, and control the second corrector to correct the second parameter by the determined correction amount,
wherein the first parameter is an exposure amount,
wherein the second parameter is a color amount, and
wherein the automatic correction controller is configured to inhibit the second corrector from correcting the color amount when the first corrector increases the exposure amount beyond a predetermined value.

15. The imaging device according to claim 14, wherein the automatic correction controller is configured to control the second corrector to correct the color amount to increase a red color when the first corrector decreases the exposure amount.

* * * * *